No. 618,496. Patented Jan. 31, 1899.
F. COX.
COOKING AND DRYING APPARATUS.
(Application filed Feb. 4, 1897.)
(No Model.)
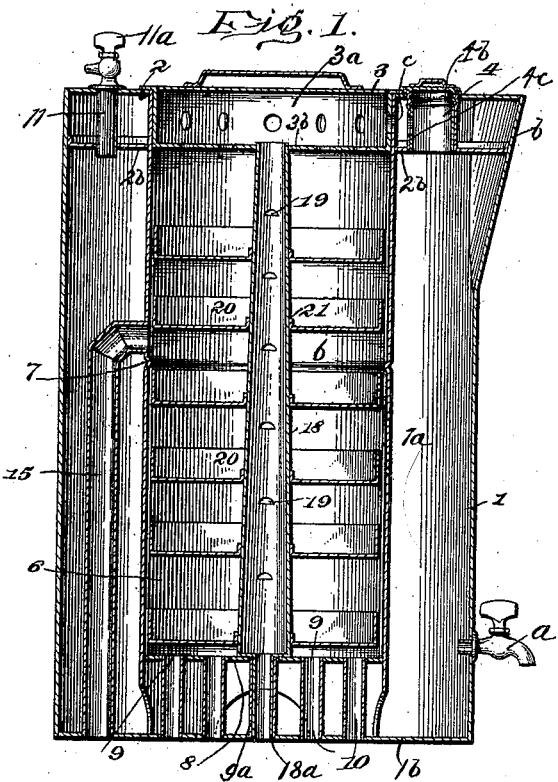
Witnesses:
Theo. L. Gatches,
J. Ross Colhoun
Inventor:
Fannie Cox.
By Frederick Benjamin,
Attorney.

UNITED STATES PATENT OFFICE.

FANNIE COX, OF FORT GIBSON, INDIAN TERRITORY.

COOKING AND DRYING APPARATUS.

SPECIFICATION forming part of Letters Patent No. 618,496, dated January 31, 1899.

Application filed February 4, 1897. Serial No. 621,942. (No model.)

*To all whom it may concern:*

Be it known that I, FANNIE COX, a citizen of the United States, residing at Fort Gibson, in the Cherokee Nation, Indian Territory, have invented certain new and useful Improvements in Cooking and Drying Apparatus; and do I hereby declare the following to be a full, clear, and exact description of the invention, such as will enable others skilled in the art to which it appertains to make and use the same.

My invention relates to improvements in fruit and vegetable drying and cooking utensils which may be used for evaporating fruit and vegetables by either dry or moist air or which may be utilized for baking or boiling purposes, as may be desired.

The construction and arrangement of my device are illustrated in the accompanying drawings, which form a part of this application, in which—

Figure 1 is a vertical sectional view of my invention as used for steaming or drying purposes. Figs. 2 and 3 are details of utensils used for boiling or baking purposes.

Like numerals and reference-letters indicate like parts in the drawings.

My improved cooker and drier consists of a double cylinder, one within the other, with a considerable space between, formed by an outer cylindrical plate 1 and an inner cylindrical plate $1^a$. The bottom of the cylinders is closed, except as shown, by a plate $1^b$, and at the top the chamber between the plates 1 and $1^a$ is closed by a plate 2. Fitting the opening at the top of the inner cylinder is a hollow cover 3, which is formed with perforated sides $3^a$ and a perforated bottom $3^b$, the lid of said cover being removable and extending over the upper edge of the plate $1^a$. Below the plate 2 and secured to the sides 1 and $1^a$ is a plate $2^b$, which forms an auxiliary closure for the outer cylinder. Extending through the plates 2 and $2^b$ at one side of the outer cylinder is a vertical inlet-pipe 4, having a cover $4^b$, and provided in its side with a port $4^c$, which communicates with the annular chamber between the plates 2 and $2^b$. At the opposite side of the outer cylinder and extending through the plates 2 and $2^b$ is a vertical escape-pipe 11, having at its upper end a valve $11^a$ and with its lower end communicating with said outer cylinder.

Extending upwardly from an opening in the bottom $1^b$ is a pipe 15, the upper portion of which is bent at right angles and passes through a suitable opening in the side plate $1^a$, the joints at the bottom and top of said pipe being water-tight.

In the lower portion of the plate 1 is an outlet-cock $a$, through which water may be drawn from the cylinder with which it communicates. If it be desired to dispense with said cock, the upper portion of the plate 1 may be made flaring, as shown at $b$, to facilitate pouring out the water.

In the lower part of the inner cylinder is a false or auxiliary bottom formed by the plate 8, through which and the bottom $1^b$ extend a series of vertical pipes 9 and 10, the upper end of said pipes communicating with said inner cylinder.

Resting on and extending from the plate 8 upwardly through the bottom of the cover 3 is a tapering pipe 18, having in its side a series of vertically-arranged ports 19. Loosely fitting the inner cylinder and mounted on the pipe 18 are drying or cooking pans 20, having suitable openings in their bottoms to fit the pipe, so that when in position they are equidistant from each other, with sufficient space above each pan to permit a free circulation of air or steam, which is admitted through the ports 19 in the pipe 18. Around said openings in the pans the bottoms are bent up to form flanges 21, which prevent leakage from the pans. The lower end of the pipe 18 has an extension $18^a$, which passes downwardly through the central pipe $9^a$ and serves to support it in position and at the same time to admit the air or steam. The upper end of the pipe 18 opens into the hollow cover 3.

In the upper portion of the side plate $1^a$, near the inlet-pipe 4, is an opening $c$, which registers with one of the openings in the side of the cover or which may be blanked by slightly turning the cover.

From the construction above set forth it will be seen that placing the utensil over a stove or a boiler the hot air or steam will enter the pipes 9, $9^a$, 10, and 15 and after passing over and around the pans 20 will pass off through the perforations in the cover 3. Hot water may be introduced into the outer cylinder and the utensil used as a boiler. The pipe 18 and pans 20 may be entirely removed and the utensils shown in Figs. 2 and 3 substituted, the annular ledge 7 serving to hold them in position. Wire trays or pans with perforated bottoms may be substituted for the pans 20 without change of the principles of construction and use of my invention.

What I claim, and desire to secure by Letters Patent, is—

1. A cooking and drying utensil of the character described, consisting of a vessel provided with means for the admission and exit of hot air or steam, and having arranged therein a pipe adapted to support a series of pans or trays, said pipe having openings through which the air or steam is admitted to said pans, substantially as described.

2. A cooking and drying utensil of the character described, consisting of a vessel provided with means for the admission and exit of hot air or steam, and having arranged therein a tapering pipe adapted to support a series of pans or trays, said pipe having an opening for the admission of air or steam, and openings for the exit of such air or steam, substantially in the manner and for the purpose set forth.

3. A cooking and drying utensil of the character described, consisting of a double cylinder, one within the other, the outer cylinder being water-tight, and the inner cylinder having means for the admission and exit of hot air or steam, and a pipe adapted to support a series of pans or trays, said pipe having openings for the admission and exit of steam or hot air substantially in the manner set forth.

4. A cooking and drying utensil of the character described, consisting of a double cylinder, one within the other, pipes for the admission of steam or hot air to the inner cylinder, a perforated cover for said cylinder, a pipe arranged and adapted to support a series of trays and conduct steam or hot air to said trays, and means for filling and emptying the outer cylinder, substantially as set forth.

5. A cooking and drying utensil of the character described, consisting of a double cylinder, one within the other, the outer cylinder being water-tight and having means for filling and emptying, and the inner cylinder being provided with pipes for the admission of steam or hot air and a perforated cover for the exit of steam or hot air, and said cylinder having one or more internal ribs for the support of pans or trays substantially as described.

In testimony whereof I have signed this specification in the presence of two subscribing witnesses.

FANNIE COX.

Witnesses:
SARAH DOWELL,
M. D. L. DOWELL.